E. AMENT.
CONDIMENT HOLDER.
APPLICATION FILED MAR. 25, 1920.

1,342,524.

Patented June 8, 1920.

Inventor
Elizabeth Ament.

By Donald L. Maxson.
Attorney

UNITED STATES PATENT OFFICE.

ELIZABETH AMENT, OF BROOKLYN, NEW YORK.

CONDIMENT-HOLDER.

1,342,524.　　　　Specification of Letters Patent.　　Patented June 8, 1920.

Application filed March 25, 1920. Serial No. 368,512.

*To all whom it may concern:*

Be it known that I, ELIZABETH AMENT, a citizen of the United States, residing at Brooklyn, in the county of Kings and State of New York, have invented certain new and useful Improvements in Condiment-Holders, of which the following is a specification.

This invention relates to condiment holders, and more particularly to that type which combines the salt and pepper shakers into one integral receptacle.

An object of the invention is to provide a suitable salt and pepper receptacle which will be easy to manipulate and which will be inexpensive to manufacture.

Another object is to provide a suitable condiment holder which will have a broad supporting surface, thereby preventing the same from being accidentally tipped or knocked over.

Other objects will appear as the description proceeds.

In the accompanying drawings which constitute a part of my specification,

Like characters of reference are used throughout the following specification to designate corresponding parts.

Figure 1:
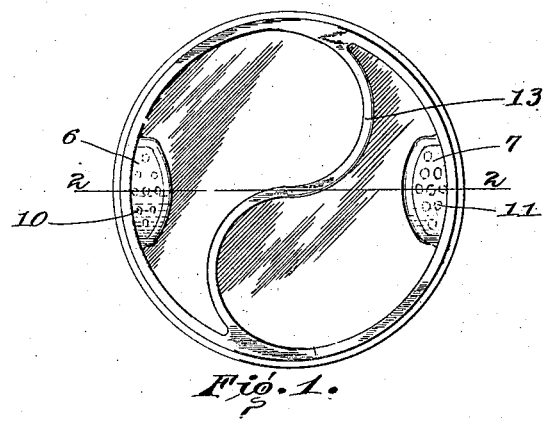
Figure 1 is a plan view of my improved condiment holder.
Figure 2:
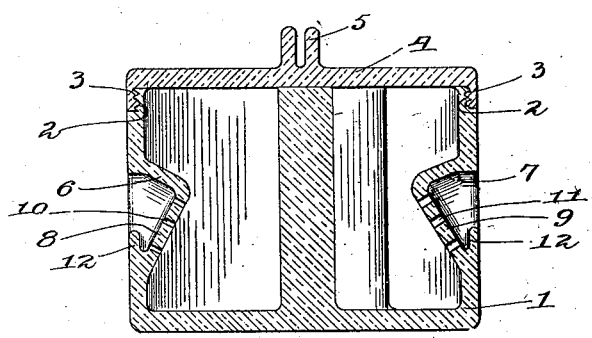
Fig. 2 is a section on the line 2—2 of Fig. 1.
Figure 3:
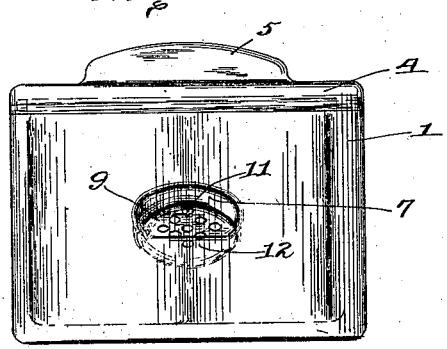
Fig. 3 is a side elevation of the condiment holder.

The condiment holder 1 is made throughout of glass, and is of integral construction. Around the periphery of the container or receptacle is formed the screw-threaded portion 2, which is adapted to engage a correspondingly screw-threaded portion 3, within the cap or cover 4, when said cover is in position. The cover 4 is provided with a pair of spaced ribs 5, which are parallel with each other, and which extend across the top of said cover, being integrally formed therewith.

Pockets or indentations 6 and 7 are formed in the opposite sides of the receptacle 1, and are provided with outwardly slanting faces or surfaces 8 and 9, through which extend the openings 10 and 11 of smaller and larger size, for the pepper and salt respectively. These surfaces 8 and 9 extend at a decided angle from the top to the bottom, and in such a manner that the lower ends will be adjacent the sides of the receptacle, while the upper ends will lie in a position relatively nearer to the center of said receptacle. At a point adjacent the bottom of each of said faces or surfaces 8 and 9, is formed a lip or guard 12, which is integral with the receptacle and extends a short distance upward in the same plane as the sides of said receptacle, thereby forming a spaced flange or guard for catching the few particles or grains of salt or pepper when filling the receptacles.

A partition 13 is formed within the receptacle 1, which is S-shaped in horizontal section, and extends from side to side of the said receptacle. It will thus be seen that when both compartments are filled, that the salt or pepper as the case may be will have a straight route to the openings 10 and 11, so that the majority of the salt or pepper will fall directly toward the said openings, which would be impossible were the partition made straight across the receptacle.

In operation, the top is removed, and the salt and pepper placed in the separate compartments, after which the lid or cover is placed in position and screwed tight. The receptacle is grasped in one hand between the two openings or pockets 6 and 7, and tipped to the desired side, or from one side to the other. There may be a few grains of the salt or pepper that would pass through the openings 10 and 11 when the compartments were being filled. In this case, it will readily be seen that the salt grains will fall from the pocket or guard into the salt compartment, when the pepper side of the condiment holder is being used. Likewise, when the salt side is being used, the pepper collected in the guard or lip on the pepper side will pass back through the openings 11 into the pepper compartment.

The spaced ribs 5 made integral with the top of the receptacle, are to be used to hold a menu, when the condiment holder is in position on the table.

This condiment holder is made entirely throughout of glass, and can be manufactured very cheaply.

The main points of invention are the structure of the discharge pockets or indentations, the S-shaped partition, and the unity of construction.

It will be understood that many minor changes in detail of construction may be resorted to without departure from the spirit of the invention.

Having thus described my invention what I claim as new and desire to secure by Letters Patent of the United States is:—

1. A condiment holder comprising a one-piece receptacle, an S-shape or pocketed partition within said receptacle and integral therewith, indented discharge means at opposite sides of said receptacle, the faces or surfaces through which the salt and pepper pass being in angular relation to the sides of the receptacle, and a detachable top, substantially as described.

2. A condiment holder of the character described comprising a one-piece receptacle, a partition within said receptacle, indented discharge means, a guard formed integrally with the sides of said receptacle and extending a slight distance above the discharge openings, a removable top, the whole being arranged so as to present an outer surface free from extensions or projections, substantially as described.

3. A condiment holder of the character described comprising an integral receptacle, an S-shape partition within said receptacle, indented angularly disposed discharge means, a lip or guard for said discharge means, said holder being of equal diameter throughout its height, and a removable top, substantially as described.

4. A condiment holder comprising an integral receptacle, a pocketed or S-shape partition formed in said receptacle, indented discharge means at opposite sides of said receptacle, lips or guards for said discharge means, said lips being at an acute angle to said discharge means, substantially as described.

In testimony whereof I affix my signature.

ELIZABETH AMENT.